United States Patent [19]
Gill

[11] 3,720,093
[45] March 13, 1973

[54] CARBON DIOXIDE INDICATING METER

[75] Inventor: George Herbert Gill, San Diego, Calif.

[73] Assignee: The United States of America as represented by the Secretary of the Navy

[22] Filed: Dec. 3, 1970

[21] Appl. No.: 94,660

[52] U.S. Cl. ................................................73/27 R
[51] Int. Cl. ............................................G01n 31/00
[58] Field of Search..........................................73/27

[56] References Cited

UNITED STATES PATENTS

| | | | |
|---|---|---|---|
| 2,633,737 | 4/1953 | Richardson | 73/27 R |
| 1,942,323 | 1/1934 | Blodgett | 73/27 R X |
| 3,558,279 | 1/1971 | McRae | 73/27 R X |
| 1,971,038 | 8/1934 | Hamilton | 73/27 R |
| 2,116,239 | 5/1938 | Hebler | 73/27 R |
| 3,106,088 | 10/1963 | Kieselbach | 73/27 R |
| 2,687,036 | 8/1954 | Minter | 73/27 R |

OTHER PUBLICATIONS

Gow-Mac Bulletin SB-GLD, "Gas Leak Detector," February, 1967, 2 pages.

*Primary Examiner*—Charles A. Ruehl
*Attorney*—Richard S. Sciascia, Ervin F. Johnston and Thomas G. Keough

[57] ABSTRACT

A pair of thermistors isolated from one another in a detector housing, are responsive to a gas sample and a reference sample to vary their impedances as a result of the different thermal conductivities of the gases. Varying the impedances unbalances a resistance bridge circuit to provide a signal representative of the percentage concentration of carbon dioxide in the gas sample. Humidifying the gas sample to a predetermined magnitude equaling the relative humidity of the reference gas, providing a spacious heat sink for maintaining the gas sample and reference sample at the same temperature, and providing baffles for preventing the direct impingement of the gas sample onto a thermistor greatly ensures a reliable, accurate determination of $CO_2$ concentration. Including operational amplifier circuits, having linear characteristics, and packaging the detector to minimize the effects of vibration and shock greatly increase reliability over contemporary devices.

1 Claim, 3 Drawing Figures

INVENTOR
GEORGE H. GILL
BY
ERVIN F. JOHNSTON
THOMAS GLENN KEOUGH
ATTORNEYS

CARBON DIOXIDE INDICATING METER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Methods and devices for determining a $CO_2$ content in air are many and varied. They include systems which rely on a gas's specific heat, its density, its infrared absorption, its ionization, its chemistry, or certain Ph tests for specific electric properties (dielectric constant, etc.). Most of these approaches are quite complicated, either having an extremely slow response, especially the techniques which rely upon a chemical analysis, or are of a relatively fragile nature requiring laboratory conditions for their successful completion. Of the many commercially available units, none were found to be entirely suitable for use as a $CO_2$ indicating meter in a deep submersible. Employment of such a detector requires insensitivity to vibration and shock, operation from an on-board battery supplied power supply, freedom from frequent zero-setting calibrations, and lightweight and compactness. The high humidity found in a submersible, as well as its widely varying temperature, also negated many of the available sensors. Because the highly confined interior of a submersible constantly must have pure breathable air, a $CO_2$ meter having any lag in response in unacceptable. $CO_2$ indicators relying on the detection and the indication of differences in thermal conductivity due to an increased presence of carbon dioxide have been produced, but tend to incorrectly indicate the $CO_2$ percentages since they are all susceptible to temperature and humidity variations, in particular.

SUMMARY OF THE INVENTION

The invention is directed to providing an apparatus for rapidly indicating $CO_2$ concentration within an enclosure by comparing the known thermal conductivity of a reference gas to the unknown thermal conductivity of a gas sample taken from the enclosure. A detector housing shaped with a lateral passageway passes the gas sample to a cavity housing a first thermistor. The detector housing also is shaped with a chamber enclosing a second thermistor and filled with the reference gas. The difference between the impedance of the first thermistor with respect to the impedance of the second thermistor, as caused by the gases' having different thermal conductivities, unbalances an electrically connected resistance bridge to transfer a signal to an indicator which is representative of the $CO_2$ concentration in the gas sample.

A prime object of the invention is to provide a $CO_2$ indicating meter of increased accuracy and reliability.

Another is to provide a meter reliably operating within the harsh environment of a submersible.

Yet another object is to provide a $CO_2$ indicating meter for producing a visual and an audio indication of dangerous $CO_2$ buildup.

A further object is to provide a meter giving a response relatively unaffected by changing humidity and temperature.

Still another object is to provide a rugged meter insensitive to ambient vibrations and shock.

Another object is to provide a $CO_2$ indicating meter employing a thermal conductivity technique that baffles the flow of a gas sample to eliminate erroneous $CO_2$ indications.

These and other objects of the invention will become more readily apparent from the drawings when taken with the ensuing specification.

DESCRIPTION OF THE PREFERRED EMBODIMENT

Figure 1:
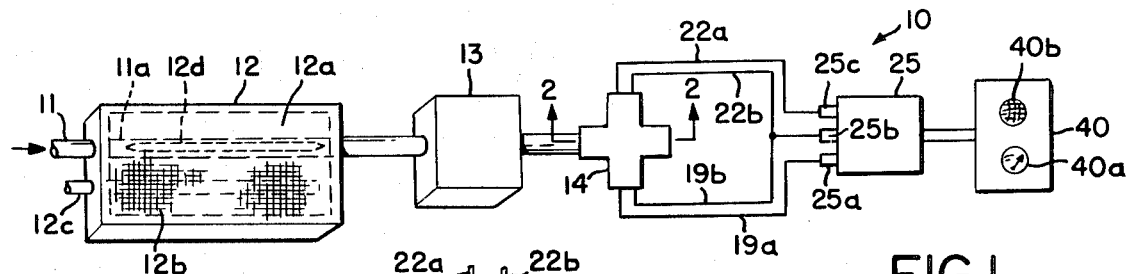
FIG. 1 is an isometric depiction of the invention.
Figure 2:
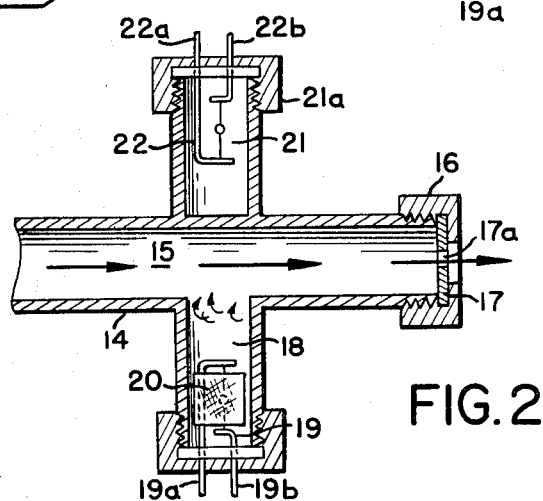
FIG. 2 is a cross-sectional view of the detector housing.

Referring now to FIG. 1 in the drawings, the Carbon Dioxide Indicating Meter is depicted in a schematic block diagram form which should not be construed as representative of the spatial relationship of the elements, they being so shown to allow a sequential description of their interrelated operation. The meter, being compact and readily adaptable to any one of various mounting arrangements, is particularly adapted to the hostile environment found on the inside of a submersible where shocks and vibrations are routine and where precise humidity control and temperature control are all but impossible. Conventional $CO_2$ indicators faced with these obstacles in this confining, harsh environment are rendered either impractical or nonfunctional.

Because of the unique configuration of the invention, the above obstacles are overcome and a $CO_2$ indicator 10 reliably analyzes a gas sample and provides an indication of its $CO_2$ content by a thermal conductivity technique. Thermal conductivity in a gas markedly increases with a higher percentage of carbon dioxide and thermal conductivity is measurable by thermistors to give a reading of $CO_2$ concentration. An accurate measuring of the carbon dioxide content in the air, to within tenths of a percent, is feasible when a sample of gas or air is analyzed by this method.

Briefly, the principle relied upon notes the difference in the thermal conductivity of a sample of gas having greater or lesser amounts of carbon dioxide. Since carbon dioxide has a high heat conductivity, a gas sample having a lesser amount of carbon dioxide than another effects a lesser cooling of a thermistor than does the other gas sample. The difference is observable and monitorable by metering devices, there having to be only a single calibration of such a carbon dioxide indicator to establish what level of $CO_2$ concentration is excessive under a certain set of conditions.

When using the foregoing thermal conductivity approach, it must be stressed that the success of such a $CO_2$ detection technique depends on constant humidity and temperature for successful operation. Water vapor has a low heat conductivity and tends to offset the high heat conductivity of excessive amounts of carbon dioxide. A gas sample having varying amounts of water vapor (relative humidity) gives untrue indications of $CO_2$ presence. For example, if it is not realized that a high degree of relative humidity is contained in the submersible's air supply, from which the sample is taken, a $CO_2$ buildup could be completely masked until it reaches dangerous or fatal portions.

The invention, drawing in a sample of gas through an inlet hose 11 passes it through a humidifier block 12 to bring the sampled gas to a near-saturation relative humidity condition. The block has a hollowed out interior 12a filled with a cloth or gauze-like material 12b wetted with available source of water transferred to the interior via a tube 12c. A pair of longitudinal slots 12d, only the top one visible in FIG. 1, are provided on diametrically opposed sides of a portion 11a of the inlet hose traversing the humidifier block, and contain a longitudinally reaching, laterally extending piece of wetted gauze-like material 12b to provide a continuously, extending wetted surface over which the gas sample is passed. Having the gas sample flow over this wetted surface, longitudinally reaching no more than three inches, humidifies it to saturation levels. The gas sample, upon traveling the length of the humidifier block, at all times is brought to within an identical range of relative humidity, that being near the saturation level, irrespective of the relative humidity of the gas sample as it is drawn into the inlet hose.

Thus, one of the limiting design criteria in employing $CO_2$ detection by the thermal conductivity method is overcome by the simple addition of the disclosed humidifier block.

A controlled volume transfer of the gas sample is ensured by including a small, self-contained impeller centrifugal pump 13, optionally mounted upstream or downstream of the humidifier block, the latter being shown in FIG. 1.

Downstream of the gas pump, a detector housing 14 receives the gas sample in its longitudinal passageway 15. At the far end of the passageway, a fitting 16 houses a disk 17 shaped with an orifice port 17a sized for restricting the flow rate through the detector housing. The flow rate is kept below predetermined limits since it otherwise induces intolerable, internal turbulence and erroneous indications of $CO_2$ presence (a high flow rate through the detector housing directly could cool thermistor 19).

A sensor cavity 18 is shaped within the detector housing and it contains a first thermistor 19 having a pair of remotely extending leads 19a and 19b. The thermistor, a device exhibiting a changed impedance as its temperature is changed, is, preferably, shielded from the direct flow of the gas sample since the direct impingement of the gas flow exacts its own cooling effect in addition to the cooling effect brought about by its discrete thermal conductivity.

First thermistor 19 is shielded further from the direct impingement of the gas sample by providing a screen-like, 40-mesh brass thimble 20 around it. The cavity and thimble isolate the thermistor from the adverse effects of direct gas flow impingement to eliminate another limitation of conventional devices.

Temperature stabilization between the gas sample and a reference gas (elaborated on below), or, being more specific, temperature equalization between the two gases is owed to the configuration and manner of construction of the detector housing. A heavy-duty T-shaped fitting made from highly thermally-conductive copper is preferred to define the longitudinal passageway and the cavity.

The detector housing is also provided with a chamber 21 enclosed by a capped cup 21a. A second thermistor 22 is suspended within the chamber and a pair of leads 22a and 22b remotely extend to join impedance values to following circuitry.

Chamber 21 is filled with a reference gas having a known carbon dioxide content. A sample of gas (air at atmospheric pressure containing a 2 percent carbon dioxide concentration) has its own thermal conductivity effecting a discrete resistance change on second thermistor 22 electrically feeding its change via leads 22a and 22b. The capped cup 21a, also formed of a similar gauge copper, are carried contiguously on an external surface of the T-shaped fitting. The ambient gas in the submersible is air, atmospheric pressured, and forms an enveloping heat sink bringing the temperature of the gas sample and the reference sample to substantially identical levels.

Any change in the resistance of either thermistor 19 or 22 is not attributed to a temperature difference between the sample gas and the reference gas or their humidities, but a resistance difference does directly represent differing levels of thermal conductivity between the gases. Each thermistor's remotely extending leads, 19a and 19b for thermistor 19, and 22a and 22b for thermistor 22, extends to a combination potential source-wheatstone resistance type bridge circuit 25 at input points 25a, 25b, and 25c.

Figure 3:
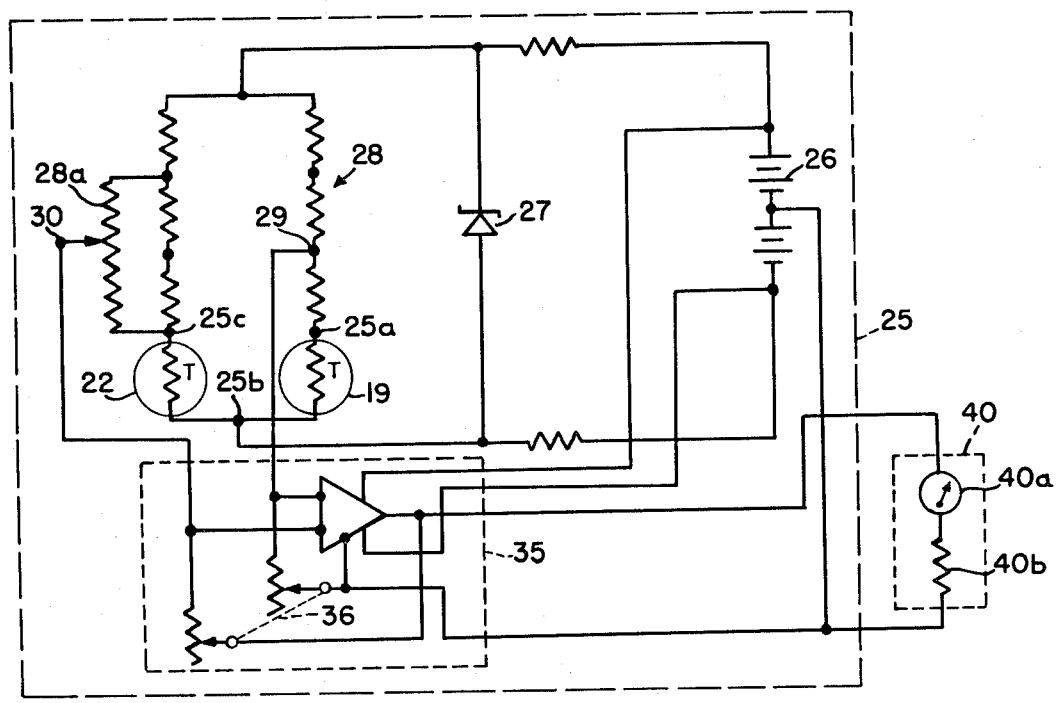
FIG. 3 is a schematic circuit representation of the elements of block 25 in FIG. 1.

Looking particularly at FIG. 3, the combination circuit is shown to electrically contain first and second thermistors 19 and 22; although physically disposed in the detector housing, the thermistors are electrically coupled to the combination circuit.

A source potential 26, having a Zener diode 27 connected across it impresses a regulated magnitude of potential across a conventional, wheatstone type resistance bridge 28, which includes the impedances presented by thermistors 19 and 22. The top two legs of the bridge contain fixed resistance elements while each of the lower two legs include, along with a serially connected resistance, either one of the two thermistors 19 or 22. A composition element potentiometer 28a allows exact balancing of the bridge to provide a zero output potential signal across points 29 and 30 when the bridge is in a balanced condition. When unbalance occurs by either of the thermistors changing its relative impedance, in a manner to be set out below, a potential signal appears across points 29 and 30 and is fed to an operational amplifier circuit 35 having a balanced add-subtract input and gain control.

The operational amplifier circuit uses a Data Device D6 op.amp. and connects it in accordance with the teachings of the Philbrick Nexus Research manual entitled:

"Applications Manual for Operational Amplifiers," copyright 1968 by Philbrick/Nexus Research, A Teledyne Company, Dedham, Mass. 02026. On pages 82 and 83, the manual shows that connection of a differential current amplifier having a varying R and a varying -R feedback resistor provides an amplifier circuit with a balanced add-subtract input, greatly improving linearity and range of response, and provides a proportional output signal across points 29 and 30.

Fine, final adjustment of the circuit is effected by a mechanically linked gain control potentiometer 36.

The proportional output signal is passed to a following indicating unit 40 which includes a meter 40a for providing a visual indication of $CO_2$ concentration and an audio speaker 40b to provide an audio warning when the $CO_2$ concentration rises above a predetermined level.

In operation, a sample of gas is pumped from the submersible's interior by gas pump 13 and is pulled through humidifier 12. The gas sample is brought to near saturation levels and is directed to longitudinal passageway 15. The gas flow rate is determined by the diameter or orifice 17a to minimize internal turbulence within the sensor cavity. Further dampening of gas flow turbulence within the cavity is ensured by brass thimble 20 which forms a protective cover about first thermistor 19.

Since first thermistor 19, as well as second thermistor 22, have a potential impressed across them from potential source 26, a slight current flow through the thermistors causes their internal heating.

The gas sample brought in contact with thermistor 19 cools the thermistor due to its inherent thermal conductivity. As the concentration of carbon dioxide increases, so does the gas sample's thermal conductivity and a greater cooling of thermistor 19 is effected.

A reference gas occupying chamber 21, for example, having a $CO_2$ concentration of approximately 2 percent, that being a maximum desirable concentration within the close confines of a submersible, cools the thermistor 22 a known amount. If the concentration of $CO_2$ in the gas sample is identical to the concentration reference gas, substantially the same degree of cooling thermistor 19 occurs, and its impedance brought to the same level as the impedance of thermistor 22.

As preestablished by carbon composition resistor 28a, when such a balance of impedance between the thermistors occurs, an output potential is impressed across points 29 and 30 and is fed to operational amplifier circuit 35. In response to receiving the output potential, the operational amplifier circuit delivers a proportional, representative controlling signal to indicating unit 40 which registers the proper $CO_2$ concentration and, if desirable, speaker 40b emits an audio alarm to the occupants of the submersible.

When the $CO_2$ concentration in the sample gas exceeds the concentration in the reference gas, a further unbalancing of the resistance bridge takes place and a representative signal across points 29, 30 causes a higher deflection of the meter 40a.

Thus, the unique configuration of the detector housing first prevents the direct impingement of the gas sample on the thermistor and automatically brings the temperature of the sample gas and the reference gas to the same temperature, eliminating the possibility of erroneous $CO_2$ readings. Furthermore, humidifying the gas sample eliminates erroneous indications of $CO_2$ presence further. The operational amplifier circuit, connected in an add-subtract configuration, minimizes the amplifier drift attendant conventional amplifier circuit connections and, due to the gain control potentiometer 36, the operational range is established.

Obviously, many modifications and variations of the present invention are possible in the light of the above teachings, and, it is therefore understood that within the scope of the disclosed inventive concept, the invention may be practiced otherwise than as specifically described.

What is claimed is:

1. An apparatus for rapidly indicating $CO_2$ concentration within a submersible by comparing the known thermal conductivity of a reference gas to the unknown thermal conductivity of a gas sample taken from the enclosure comprising:

a humidifier block connected to receive said gas sample having a wetted longitudinal duct for raising the humidity of said gas sample to a near saturation level;

a gas impeller joined to said humidifier block for ensuring the transfer of said gas sample;

a detector housing connected to said gas impeller shaped with a lateral passageway for receiving and transferring said gas sample, a cavity communicating with said passageway for receiving said gas sample, said passageway and said cavity cooperating to define a T-shaped cross-sectional area for allowing a free access to said gas sample, and a chamber containing said reference gas being disposed opposite said cavity outside of said passageway, said detector housing being constructed of a highly thermally-conductive material to maintain said gas sample and said reference gas at substantially the same temperature;

an orifice member mounted in said lateral passageway downstream from said cavity for restricting the flow of said gas sampled therethrough and for reducing gas flow turbulence in said cavity;

a first and second thermistor responsive to temperature changes to proportionally change their impedances mechanically disposed in said cavity and said chamber, respectively, and a screen-like mesh for blocking the direct impingement of said gas sample on said first thermistor, said first and second thermistors providing a sample impedance and a reference impedance, respectively;

a bridge circuit electrically coupling said first and second thermistor into two of its legs;

a potential source coupled to said first and second thermistor to preset the magnitude of said sample impedance and said reference impedance; and an amplifier-readout circuit including an operational amplifier suitably connected for minimizing drift providing a visual and audio readout connected across said bridge circuit for receiving a signal representative of the difference of the potential drop across said sample impedance with respect to the potential drop across said reference impedance, the potential drops being attributed to the difference in cooling capacity of said gas sample with respect to said reference gas to indicate said $CO_2$ concentration.

* * * * *